United States Patent [19]

Hedlund

[11] Patent Number: 5,173,650
[45] Date of Patent: Dec. 22, 1992

[54] METHOD AND A DEVICE FOR SENSORLESS CONTROL OF A RELUCTANCE MOTOR

[75] Inventor: Bengt G. Hedlund, Danderyd, Sweden

[73] Assignee: Aktiebolaget Electrolux, Stockholm, Sweden

[21] Appl. No.: 669,414

[22] PCT Filed: Jul. 20, 1990

[86] PCT No.: PCT/SE90/00498

§ 371 Date: Mar. 21, 1991

§ 102(e) Date: Mar. 21, 1991

[87] PCT Pub. No.: WO91/02401

PCT Pub. Date: Feb. 21, 1991

[30] Foreign Application Priority Data

Jul. 28, 1989 [SE] Sweden ............... 8902619

[51] Int. Cl.⁵ .................................. H02P 1/46
[52] U.S. Cl. .................................. 318/701
[58] Field of Search ............ 318/696, 685, 700, 701, 318/254

[56] References Cited

U.S. PATENT DOCUMENTS

| 3,956,678 | 5/1976 | Byrne et al. | 318/138 |
| 4,670,696 | 6/1987 | Byrne et al. | 318/700 |
| 4,868,478 | 9/1989 | Hedlund et al. | 318/696 |

FOREIGN PATENT DOCUMENTS

WO88/0295 10/1986 World Int. Prop. O.

OTHER PUBLICATIONS

Ray et al., High-Performance Switched Reluctance Brushless Drives, IEEE Trans. on Industry & Appl. vol. 1A-22; Jul./Aug., 1986, pp. 722-730.

Primary Examiner—William M. Shoop, Jr.
Attorney, Agent, or Firm—Pearne, Gordon, McCoy & Granger

[57] ABSTRACT

In a method for sensorless control of a reluctance motor the actual magnetic flux is compared with tabulated values of the non-linear function between the magnetic flux and the current for the angular position at which a commutation signal (via P15-P18) is to be emitted to the power stages (1-4) for the stator pole windings (H10-H13) of the motor. The actual value of the magnetic flux is calculated for each sample interval, based on the sampled values of voltage (u via P7) and current (i via P8) according to the relation $\Delta \Psi = (u - R \cdot i) \Delta t$, where R is the resistance of the actual pole winding and the actual power stage. The instantaneous flux value $\Delta \Psi$ received is added to the value of the magnetic flux previously received. The added value constitutes the actual value, referred to above, which is to be compared with tabulated values.

6 Claims, 4 Drawing Sheets

METHOD AND A DEVICE FOR SENSORLESS CONTROL OF A RELUCTANCE MOTOR

BACKGROUND OF THE INVENTION

1. Field of the invention

The present invention refers to a method and a device for sensorless control of a reluctance motor in dependence on motor parameter values measured in the output stage of the motor. By processing in a microprocessor of said values, at predetermined values a commutating signal is initiated for the actual phase of the reluctance motor.

2. Description of the prior art

A reluctance motor can be designed for single-phase or multi-phase operation and has a stator with excitation windings arranged polewise. In a common type reluctance motor the stator comprises four poles while the rotor has two poles. The four poles of the stator are arranged so as to form a cross and the rotor has a design locating its poles in diametrically opposite positions. In this 4/2-pole motor the stator poles are activated in pairs twice per revolution, whereby the pole pair, thus activated, generates a magnetic field forcing the rotor to take the position in which the magnetic resistance, or the reluctance, of the magnetic circuit has its minimum value. For the continued operation of the rotor a commutation is required of the current supply to the stator poles so that the stator pole pair to folio be activated at the same time as the stator pole pair presently supplied is cutoff.

Normally, this commutation is controlled by voltage or current pulses being synchronized with the position of the rotor. In order to achieve this, usually, one or several rotor position sensors are being used which generate control signals in dependence on the angular position of the rotor. The sensors are optical or magnetic type sensors resulting in the need for an extra element to be disposed adjacent to the rotor. In practice, the use of such rotor position sensors has been found to considerably complicate the manufacture and installation of the motor.

Therefore, various types of sensorless commutation control have been suggested. In which some kind of measuring and/or calculation of the Inductance of the motor has been used. Accordingly, it is known to make inductance calculations based upon:

1. the measurement of the frequency and/or the amplitude of an oscillator connected to the winding of the respective stator pole pair (U.S. Pat. No. A4,520,302), or upon 2. the measurement of the derivative of the current in the winding during a voltage pulse applied (SE-B-8604308-0), or upon 3. the calculation of the magnetic flux by dividing the applied voltage by the current measured (SE-B-8604307-2).

In principle, in all of the solutions presented a measurement of the inductance, or the differential inductance, of a phase takes place and the value thus measures is then compared with a limit value for the commutation. The known solutions operate in a bad way or doesn't operate at all when the reluctance motor is operated at high speed or at high load. In the latter case the motor is saturated, i.e. the inductance changes due to the fact that the current changes. Various variants of current compensation have been tested with varying success. However, such current compensation causes the construction of the circuit to become more complicated.

SUMMARY OF THE INVENTION

Accordingly, the object of the present invention is to achieve by relatively simple means, a method and a device for sensorless control of a reluctance motor, wherein the drawbacks of the known methods. referred to above, are remedied. The object is achieved in accordance with the invention, contrary to the determination of the inductance taking place in the known devices, by determining of the actual magnetic flux only said flux being compared with a flux value which is a predetermined non-linear function of the current.

The present invention makes use of the fact that, for each angular position, the reluctance motor has a determined, non-linear relation between the magnetic flux and the current in the windings of the stator pole pair. It has been established that the flux is a monotonically increasing function of the current. By sampling of the voltage and current of the output stages for the motor windings, for each sample interval, the actual magnetic flux $\Psi_m$ can be calculated according to the formula $\Psi_m \int(\mu - R\cdot i)dt$. The actual value received is compared with a predetermined non-linear function of the current, being the motor flux as a function of current at a given angle of rotation. This angle is the angle at which a commutating signal is desired. When the actual value of the flux $\Psi_m$ equals or crosses the value determined by the predetermined function cf the current $\Psi_{(i)}$, a commutating signal is initiated.

BRIEF DESCRIPTION OF THE DRAWINGS

The method for sensorless control of a reluctance motor according to the invention will be described more in detail below in connection with a preferred embodiment of a device by which the method can be performed said device being disclosed in the drawings enclosed herewith, in which.

DESCRIPTION OF THE PREFERRED EMBODIMENT

Figure 1A:
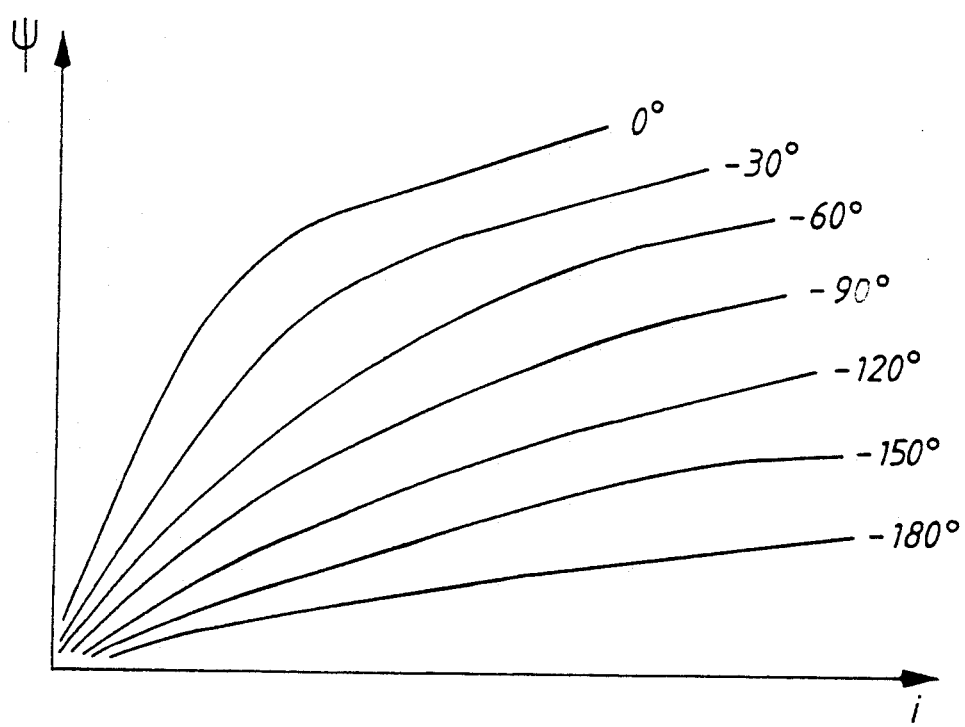
FIG. 1a shows a diagram of the basic relationship between the magnetic flux and the current in a reluctance motor.

In FIG. 1a a diagram is shown of the non-linear relationship prevailing in a reluctance motor between the magnetic flux $\Psi_m$ and the current i in one phase at different angles of rotation of the rotor in said motor. As appears from the diagram, the magnetic flux is a monotonically increasing function of the current for each angular position. For a reluctance motor having doubly-salient poles, normally, the mutual inductance between the poles is negligible. Then, flux and current in one phase can be studied disregarding the remaining phases.

Figure 1B:
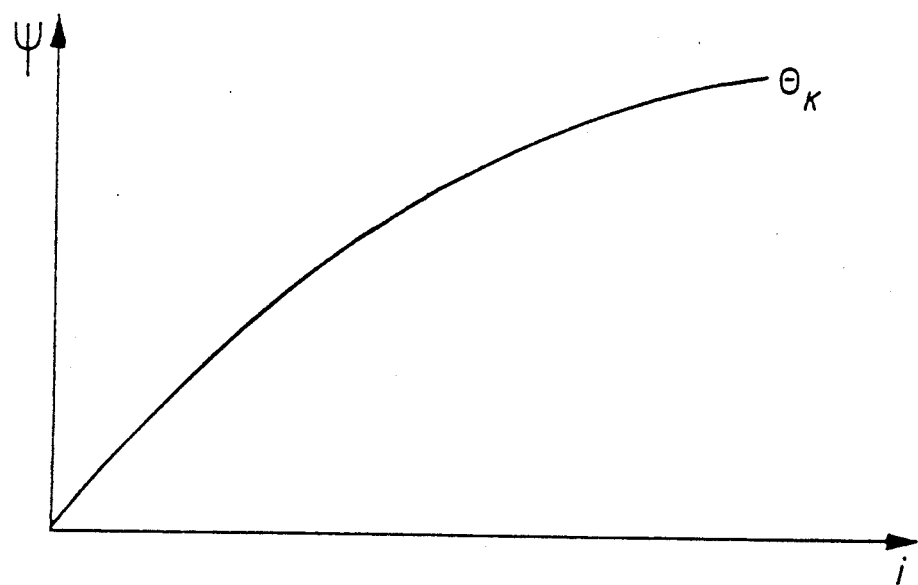
FIG. 1b shows a diagram of the function $\Psi_{(i)}$ for a commutation angle $\theta_K$.
Figure 1C:
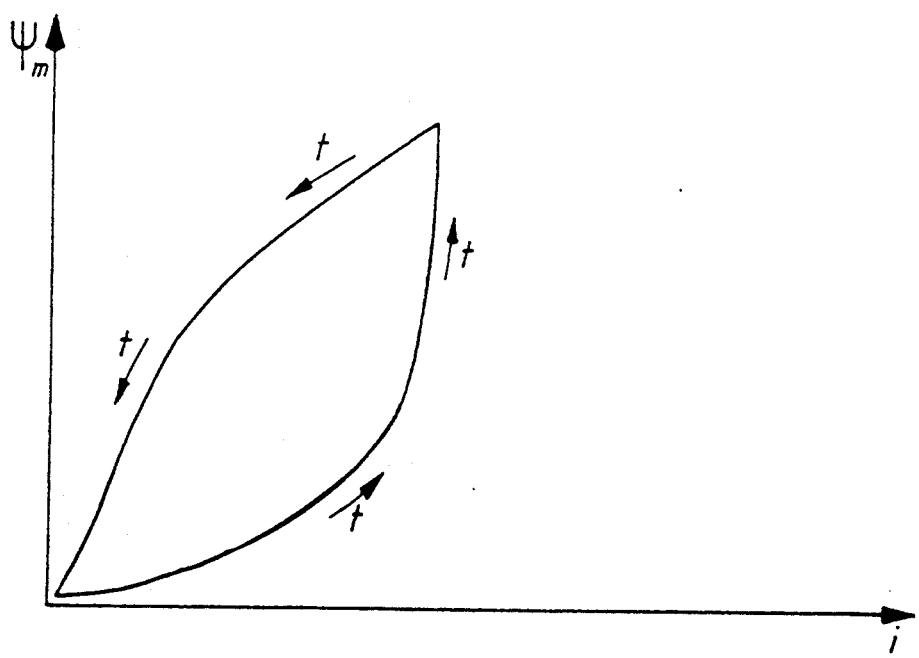
FIG. 1c shows the calculated flux $\Psi_m$ of one phase during operation of the motor, the angle $\theta$ being variable and the course of time indicated by arrows t.
Figure 1D:
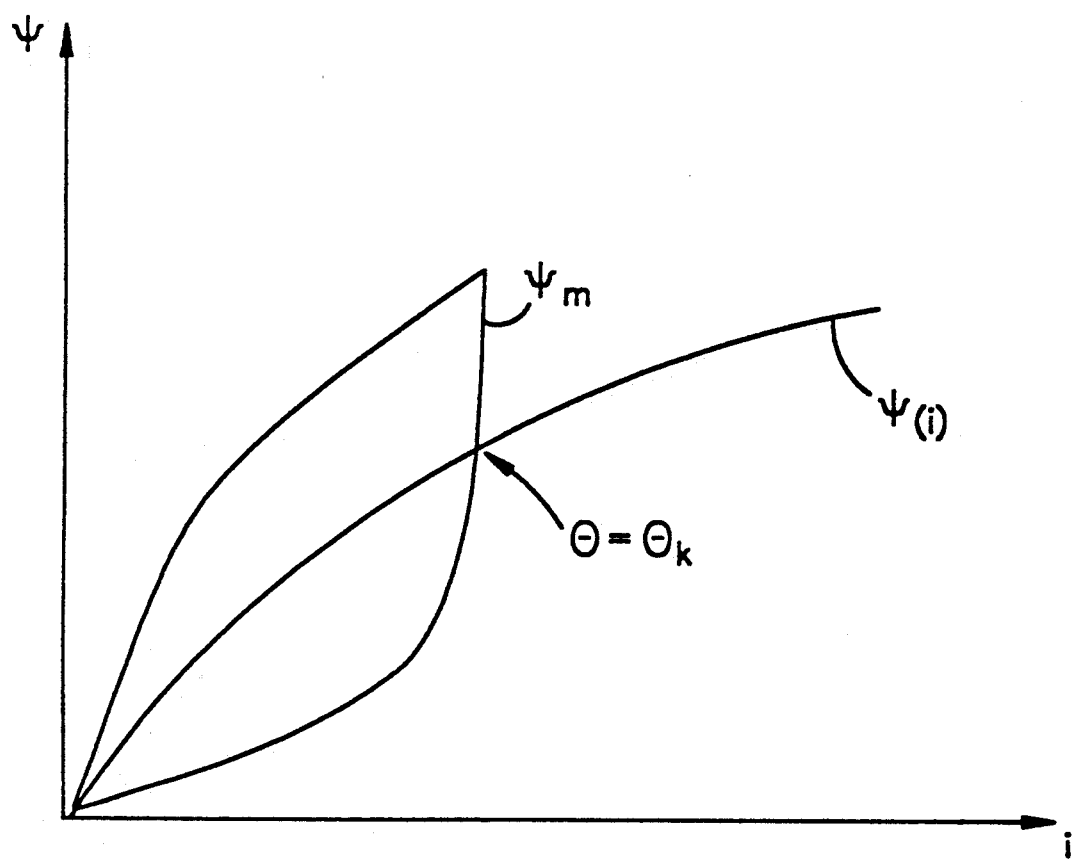
FIG. 1d shows the superposed diagrams of FIGS. 1b and 1c, the point of intersection $\theta = \theta_K$ between the graph $\Psi_m$ for the calculated flux in operation and the graph $\Psi_{(i)}$ for tabulated values indicating the position where a commutation signal is desired.

The invention will be described below, however not limited to it, in connection with a reluctance motor having salient poles and comprising a four-pole stator and a two-pole rotor. The windings of the stator poles are interconnected in pairs and the poles of the rotor are disposed in diametrically opposite positions. In a 4/2-pole reluctance motor, thus referred to, the stator poles are activated in pairs twice per revolution. Each phase is activated during an angular interval in which a positive torque is emitted. Normally, a rotor position sensor is used to control the turn-on and turn-off of the phases. The rotor position sensor emits a commutation signal used by the control device to supply drive pulses to the motor. The drive signals are synchronized with the commutation signal of the sensor, however, not necessarily identical to said signal. In this connection, by a commutation signal a signal is meant to which the commutation is referred and not a signal giving a direct commutation. In accordance with the present invention the commutation signal is not created by a rotor position sensor but instead by a comparison. FIG. 1d, between the actual value of the magnetic flux $\Psi_m$. FIG. 1c, and a given function $\Psi_{(i)}$ of the instantaneous current, FIG. 1b.

Figure 2:
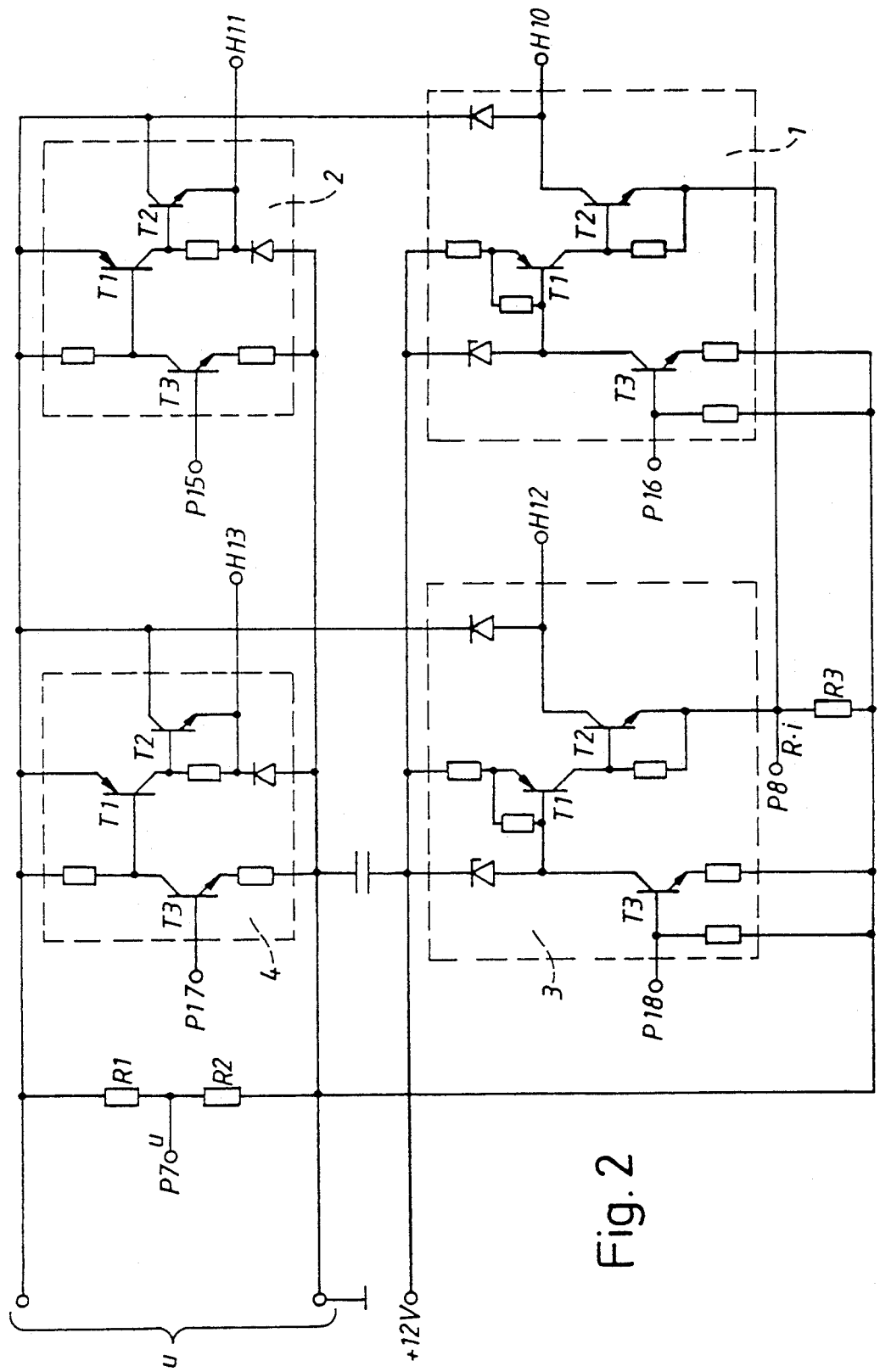
FIG. 2 shows a basic circuit diagram for current supply of the stator windings of the reluctance motor according to the present invention.

FIG. 2 shows a basic circuit diagram of the current supply of the stator windings in a two-phase reluctance motor. Each winding terminal H10, H11, H12, H13 has been allotted a power stage 1, 2, 3 and 4, respectively. Because the stator windings operate in pairs, the power stages cooperate too. The power stages 1 and 2 refer to the phase with the terminals H10, H11 while the power stages 3 and 4 refer to the phase having the terminals H12, H13.

The power stages 1–4 are supplied with voltage from the power supply U of the motor. Each power stage 1–4 comprises a drive stage, having two transistors T1, T2, and a trigger transistor T3. The output of the drive stage T1, T2 is connected to the respective one of the winding terminals H10–H13, while the input of said stage is controlled by the trigger transistor T3, the base of which is intended to be supplied with commutation signals applied to the respective input terminal P15–P18, connected to the base of said trigger transistor T3.

In the preferred embodiment of the present invention the instantaneous values of voltage and current in the power stages are sampled. Accordingly, sampling of voltage takes place via a voltage divider R1, R2 connected across the voltage source U, the sampled voltage u being tapped at the terminal P7. The sampled current is tapped at the terminal P8 in the form of a voltage value R · i, where R is the added resistance of the actual pole winding and the actual power stage.

Figure 3:
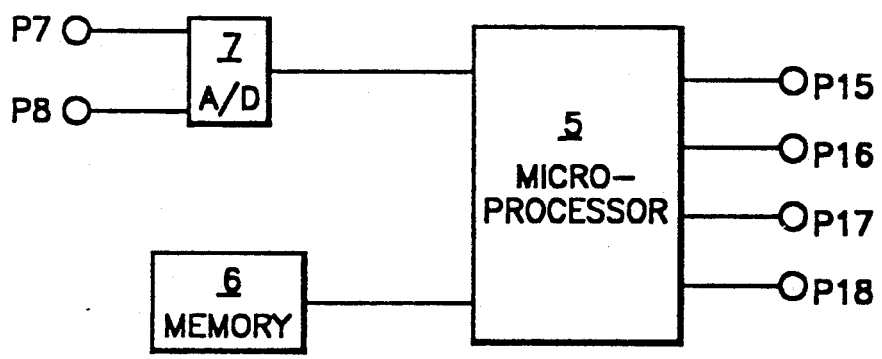
FIG. 3 shows a block diagram for the control circuit of the current supply device according to FIG. 2.

The sampled values, tapped at the terminals F7, P8, are fed to the input terminals, having the same reference numerals, of a control circuit, the block diagram of which is shown in FIG. 3. The control circuit comprises a microprocessor 5, to which is connected a memory 6 and an analog/digital converter 7. In the memory 6 predetermined values $\Psi_{(i)}$ of the magnetic flux as a function of the current are stored in tabulated form for different angular positions of the rotor poles in which a commutation signal is to be emitted. The micro- processor 5 has a control output P15–P18 for each power stage 1, 2, 3, 4, the control inputs of which have been given the same reference numerals as in FIG. 2.

As indicated above, in the example of the two-phase motor type, in operation of the reluctance motor the power stages 1, 2 and 3, 4 of the stator pole pair are activated alternately. For each drive pulse the microprocessor periodically samples the voltage U (terminal P7) and the current i (terminal P8), the values of which are being inputted in the microprocessor 5. From these values the function $\Delta\Psi = (u - R \cdot i)\Delta t$ is created, where u = U when both power stages are conducting, u = O when only one of the power stages is conducting, u = −U when none of the power stages is conducting, R is the resistance in the winding plus the power stage, and $\Delta t$ = the time interval for which $\Delta\Psi$ is calculated.

By adding of $\Delta\Psi$ to the previous flux value, the actual value $\Psi_m$ of the magnetic flux is achieved. At the beginning of each drive pulse $\Psi_m = 0$. The actual flux value $\Psi_m$ is compared with the tabulated value $\Psi_{(i)}$ in the memory 6. If, then, the value $\Psi_m$ equals or has crossed the value $\Psi_{(i)}$, commutation signals are being initiated by the microprocessor 5. This commutation signal is thus received at a determined angular position for each pulse. This signal is then used by the microprocessor as if it was a signal from an external rotor position sensor. Except for the fact that the generation of the commutation signal takes place without the use of any sensor the control device operates in the same way as a device using a sensor. As known from the literature, see for example T. J. E Miller: "Switched Reluctance Motor Drives", Ventura, Ca. 1988, the control can be performed in many different ways. The way chosen does not influence on the generation of the commutation signal in accordance with the present invention.

Hence, by the device according to the invention, by simple means, a method is created for sensorless control of reluctance motors. As indicated above, for the purpose of illustration only, the principal assembly of a 4/2-pole motor has been used, however, not restricting the invention to this specific motor type. In addition, the embodiment chosen must not be considered as restricted to a control technique making use of transistors, even if, at present, this technique is the most advantageous one.

I claim:

1. A method for sensorless control of a reluctance motor in dependence on measured voltage and current parameter values taken from the power stages of the motor comprising the steps of:

storing predetermined pairs of related values of magnetic flux and current in the respective pole winding, said values being determined by means of a non-linear function of magnetic flux versus current for each value of an angle of rotation at which commutation is to be initiated;

determining an actual flux value in said respective pole winding;

comparing said actual flux value with said stored flux value; and initiating a commutation signal when said actual flux value equals or exceeds said stored flux value.

2. A method according to claim 1, wherein a microprocessor is used for determining of the value of the actual magnetic flux by sampling the instantaneous values of voltage and current, respectively, further comprising the steps of feeding said values of voltage and current to the microprocessor for the calculation of a change of flux $\Delta\Psi$ according to the relation $\Delta\Psi = (u - R \cdot i) \Delta t$, where R is the sum of the resistance of the actual pole winding and the actual power stage, adding said change of flux to a value of flux previously received, the total value constituting the actual value of the flux.

3. A device for sensorless control of a reluctance motor, comprising a power stage for each pole winding of the stator of the motor, said power stage being connected to a power supply of the motor and being activated in dependence of a commutation signal received from a control circuit including a microprocessor; and a memory, connected to the microprocessor, provided for storing of predetermined pairs of related values of magnetic flux and current appearing in said power stage for angular positions in which a commutation signal is desired, the control circuit comprising means for determining of the actual value of the magnetic flux to be compared with the corresponding flux value stored in the memory in order to initiate a commutation signal when the actual value equals or exceeds the stored value.

4. A device according to claim 3, wherein the means for determining of the actual value of the magnetic flux comprises sampling means for sampling of the instantaneous values of voltage and current, respectively, of the actual power stage, said sampled values, via an analog/digital converter, being fed to the microprocessor for calculating of the change of flux $\Delta\Psi$ according to the relation $\Delta\Psi = (u - R \cdot i) \Delta t$, where R is the sum of the resistance of the actual pole winding and the actual power stage, an addition taking place in the microprocessor of the value of the change of flux added to the value of flux previously received, the total value constituting the actual value of the flux.

5. A device according to claim 3 or claim 4, wherein each power stage comprises a transistor controlled by the commutation signal.

6. A device according to claim 4, wherein the sampling of the supply voltage for the motor takes place via a voltage divider and the sampling of the current through the pole windings takes place via a current measuring resistor.

* * * * *

UNITED STATES PATENT AND TRADEMARK OFFICE
CERTIFICATE OF CORRECTION

PATENT NO. : 5,173,650  
DATED : December 22, 1992  
INVENTOR(S) : Bengt G. Hedlund Page 1 of 2

It is certified that error appears in the above-identified patent and that said Letters Patent is hereby corrected as shown below:

On the Title page, item [30] Foreign Patent Documents, line 1, delete "WO88/0295" and insert --WO88/02951--.

Column 1, line 29, delete "folio" and insert --follow--;

line 44, delete "suggested. In" and insert --suggested, in--;

line 45, delete "Inductance" and insert --inductance--; and, lines 60 - 61, delete "measures" and insert --measured--.

Column 2, line 23, after "$T_s$." (second occurrence) insert --=--; and, line 30, delete "cf" and insert --of--.

Column 3, line 25, delete "comparison." and insert --comparison,--; and line 26, delete "$T_s$." and insert --$T_s$,--.

Column 5, line 2, after "of" (first occurrence) insert --:-- (colon);

UNITED STATES PATENT AND TRADEMARK OFFICE
CERTIFICATE OF CORRECTION

PATENT NO. : 5,173,650

DATED : December 22, 1992

INVENTOR(S) : Bengt G. Hedlund

It is certified that error appears in the above-identified patent and that said Letters Patent is hereby corrected as shown below:

Column 5, line 5, delete "resistance" and insert --resistances--;

line 6, before "adding" insert --and
$u = U$ when both power stages are conducting,
$u = 0$ when only one of the power states is conducting,
$w = -U$ when none of the power stages is conducting,
$u =$ terminal voltage, and
and $\Delta t =$ the time interval for which $\Delta$ is calculated;--.

Column 6, line 11, delete "resistance" and insert --resistances--.

Signed and Sealed this

Nineteenth Day of October, 1993

Attest:

BRUCE LEHMAN

*Attesting Officer*     *Commissioner of Patents and Trademarks*